Patented Apr. 10, 1923.

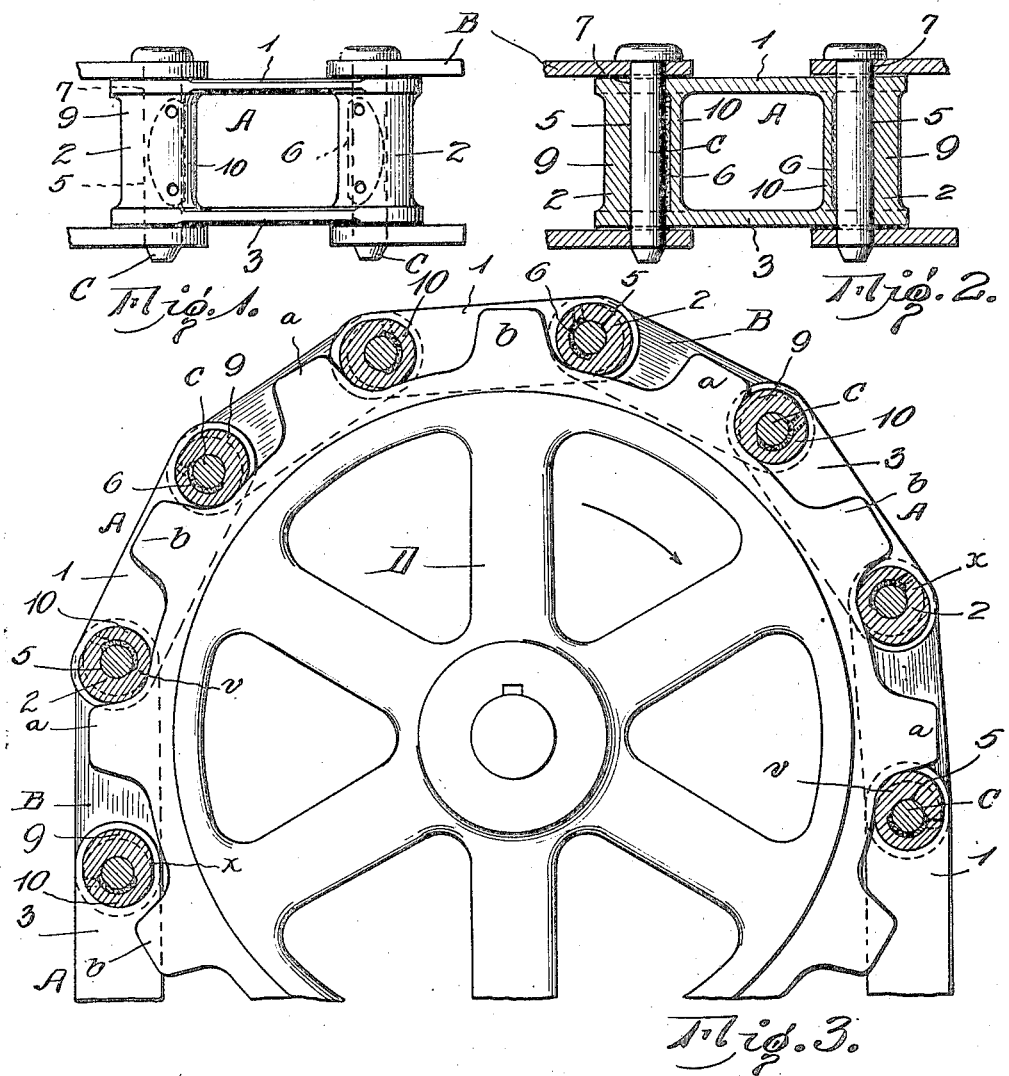

1,451,625

UNITED STATES PATENT OFFICE.

WILLIAM L. MONTAGUE AND GEORGE BRINTON WELSER, JR., OF MILWAUKEE, WISCONSIN, ASSIGNORS TO CHAIN BELT COMPANY, OF MILWAUKEE, WISCONSIN, A CORPORATION OF WISCONSIN.

SPROCKET CHAIN.

Original application filed September 24, 1921, Serial No. 502,871. Divided and this application filed January 29, 1923. Serial No. 615,722.

*To all whom it may concern:*

Be it known that we, WILLIAM L. MONTAGUE and GEORGE BRINTON WELSER, Jr., citizens of the United States, residing at Milwaukee, in the county of Milwaukee and State of Wisconsin, have invented certain new and useful Improvements in Sprocket Chains, of which the following is a specification.

Our invention relates to sprocket chains employed for conveying and power transmitting purposes. In using such chains where the material being handled is of a gritty, corrosive or abrasive nature it is necessary that the chains possess great strength and good wearing qualities; and it is highly desirable that the rapid wear of the chains and the sprocket wheels with which they engage, due to sliding of the links upon the wearing faces of the sprocket wheels as the links of the chains seat themselves upon the latter, which wear is the more rapid when material such as has been indicated is being handled, should be reduced to a minimum. The invention therefore consists in a novel construction of the links of the chain in order to insure better coaction between the sprocket chains and the sprocket wheels and to reduce the wear incident to the working engagement of these parts.

In the accompanying drawings—

Figure 1 is a plan view of a short section of a chain to which our invention is applied.

Fig. 2 is an elevation showing the chain in working engagement with the head sprocket wheel of an elevator, some of the links being in longitudinal section.

Fig. 3 is a horizontal sectional view through a short section of a chain.

Fig. 4 is a longitudinal vertical section illustrating our invention applied to a chain the links of which are somewhat different from those shown in the other views.

In the drawings 1 represents what is known as a block link, that is, a unitary or one piece link formed with tubular end bars 2, 2, united by side bars 3, 3. Block links are usually made of malleable iron. Duplicate block links are united by connecting side plates B, B which are commonly made of steel. Pintles C pass through holes formed in the ends of the side plates B and through the tubular end bars 2 of the block links. The pintles are held against rotation in the side plates and are free to turn in the end bars 2. This type of chain is well known and in common use and has been selected for the purpose of illustrating our invention, since it is a type of chain possessing great strength and good wearing qualities and being therefore especially well adapted for use in conveyors and elevators handling material of the kinds already referred to. However, our invention is not limited in its useful application to this particular type of chain. The chain represented in Figs. 1, 2 and 3 has the openings through the end bars 2 of the links each enlarged on one side of the pintle, as indicated at 6, for the primary purpose of reducing the tendency of the pintles to become united with the cross bars by rust or corrosion of the metals, incident to the nature of the material being handled, and for the secondary purpose of forming a cavity into which hard grease may be forced in order to prevent the material being handled from getting into the cavity 6, and also for lubricating the articulating joints of the chain. In forming the opening through the end bar the surface 5 is produced, concentric with the wearing surface of the pintle and of such radius that the pintle fits it closely. The surfaces 5 are toward the ends of the link A, while the relieved or enlarged portions of the bore through the end bars are toward the inside or middle portion of the link. The end portions 7 of the bore, through the end bars 2, are cylindrical and preferably concentric with the wall 5, and hence fit the pintle closely, this arrangement being of advantage as it prevents escape of the lubricant placed within the cavity 6 and also tends to prevent the entrance of abrading and corroding material from the outside into the cavity.

In Fig. 2, D represents the head wheel of an elevator with which the chain that has been described engages. In elevators the head sprocket wheels carry the load while the foot sprocket wheels function primarily as guides or idlers to hold the elevator chains taut and in place. It follows that good sprocket action, that is, with the least rubbing or grinding between the sprocket teeth and the cross bars of the chain, is highly desirable where the stresses are the greatest, that is, in connection with the head or driving sprocket. Good sprocket action maintains when the driving sprocket teeth are caused to engage with the outside of an end bar of a block link A, while on the other hand, poor sprocket action at the head or driving wheel takes place when a sprocket tooth comes into driving engagement with the inside of an end bar. We therefore construct the chain so that the sprocket teeth of the wheel D come into driving working engagement with the outside ends of the rear cross bars of each block link.

If a chain such as described, formed of alternate block links A and side plates B, be properly applied to a sprocket wheel, like that designated D except that every other tooth is omitted, then good sprocket action or working contact of the sprocket teeth with the chain would always be secured, the teeth engaging with the outer faces of the rear end bars only of the links and never engaging with a cross bar on its inner face. But the advantages of an odd sprocket tooth arrangement, which are well understood in the conveyor art, would have to be sacrificed with a wheel arrangement such as just supposed where alternate teeth are omitted. Therefore, in order to get good sprocket action without omitting any of the sprocket teeth of the wheel, and also for the purpose of adapting our chain to be used in connection with sprocket wheels of standard construction in elevators and conveying systems that are already installed, we thicken the end bars 2 on the sides towards the ends of the links A, as indicated at 9. And we also prefer that the thickness of the metal on the inner sides of the end bars, at 10, shall be less than that at 9, in order that there shall be no grinding action and undue wear between the chain and the sprocket teeth which may come opposite these inner faces of the end bars.

In Fig. 2 the working sprocket teeth are designated $a$ and those that for the moment are inactive are designated $b$. The direction in which the sprocket wheel is being turned is indicated by the arrow. Referring now to this view, it will be seen that the joint $x$ of the chain,—a forward joint of a block link A—is approaching the wheel and will come into contact therewith near the base of an inactive tooth $b$, which will lie directly behind the inner face of the cross bar but without direct engagement therewith, since the face of the said bar toward this tooth,—the inner face—is reduced in thickness, as at 10.

As the cross bar of the joint $x$ takes its seat on the sprocket wheel, the side plates B next forward of the joint flex, relative to the block link A next in advance, causing the pintle of the joint $v$, with which the said side plates are fixedly connected, to turn in its seat in the cross bar 2 of the last said joint. Thus there is no grinding or destructive action between the joints $x$ and the sprocket wheel as the former come into engagement with the wheel. As the next succeeding joint $v$ is engaged by a sprocket tooth $a$, the block link A—of which the said joint $v$ is a part—turns about the pintle of the joint $x$ that has been described; and although this causes a turning movement of the cross bar of the joint $x$ on its seat on the wheel, there is little wear incident thereto, since the bar is not in engagement with a tooth of the wheel, and the joint $x$ is not a driving joint. The cross bar of the joint $v$ in coming into working engagement with the sprocket tooth merely slides into place and does not rotate, so there is little wear and grinding action incident to these movements.

On the opposite side of the wheel where the chain leaves it, as a joint $v$ separates from the driving sprocket $a$ there is a slight rolling action of the cross bar of said joint when breaking contact with the sprocket tooth, which is of advantage in effecting release. The joint $x$, which is not in direct engagement with the tooth $b$ does not rotate, and being out of contact with the tooth there is no wear here as the chain leaves the sprocket.

It will thus be seen that by increasing the thickness of the cross or end bars on the outer ends or faces thereof good sprocket action is insured, since the full effect of the load does not come into play to cause a grinding action between the sprocket tooth and the end of the link, but rather the links seat themselves easily and without abrasive or grinding action. The block links A successively seat themselves and all rotation takes place between the pintles and cross bars as the successive links engage with the driving sprocket wheel. The inside face of the cross bars, where grinding action with the sprocket teeth would otherwise occur, are not enlarged, but preferably are reduced in thickness, so that these faces of the cross bars do not contact with the sprocket teeth and therefore poor sprocket action at these points is eliminated.

While we prefer that the construction of the cross or end bars of the block links should be as shown and described, that is, having the openings for the connecting pintles enlarged or relieved on one side,—the side away from the thickened ends of the cross bars—it is not essential to some of the advantages of our invention that the pintle bore should thus be relieved, as is indicated by the chain shown in Fig. 4 where the openings through the end bars fit the pintles closely.

We do not in this application make broad claim to a pintle-connected chain in which the end bars of the links through which the pintles pass are relieved or enlarged on their inner sides as represented in the drawings, since this feature forms the subject matter of our aforesaid application for patent, Serial No. 502,871, of which this case is a division.

What we claim is:

1. A sprocket chain comprising links having tubular cross bars and pintles uniting the links and passing through the cross bars, the walls of the tubular cross bars being thickened toward the ends of the links so as to be engaged by the driving sprockets with which the chain engages, thereby advancing the links and tending to prevent destructive wear between the sprocket teeth and chain as the latter seats itself upon and leaves the wheel.

2. A sprocket chain comprising links having tubular cross bars and pintles uniting the links and passing through the cross bars, the walls of the tubular cross bars being thickened at the outer ends of the links to advance the links and prevent destructive wear between the driving sprocket teeth and the cross bars of the chain; the inner faces of the cross bars, where poor sprocket action would otherwise occur, not being thickened and thus not being in contact with sprocket teeth.

3. A sprocket chain comprising links having tubular cross bars and pintles uniting links and passing through the cross bars, the openings through the cross bars having working faces on the sides toward the ends of the links shaped to fit the pintles, and faces on the opposite sides offset so that the contacts with the pintles on that side is relieved, the walls of the tubular cross bars being thickened at the ends of the links so as to advance the links and prevent destructive wear on the loaded sprocket teeth with which the chain engages; the inner ends of the cross bars where poor sprocket action would otherwise occur not being thickened and thus not being in contact with sprocket teeth.

4. A chain such as described in claim 3 in which the longitudinal openings through the cross bars fit the pintles closely at their ends while the intermediate parts of such openings are offset as described.

WILLIAM L. MONTAGUE.
GEORGE BRINTON WELSER, Jr.